(12) United States Patent
Vinke

(10) Patent No.: US 11,286,912 B2
(45) Date of Patent: Mar. 29, 2022

(54) WIND TURBINE ROTOR BLADE AND LIGHTNING PROTECTION SYSTEM FOR A WIND TURBINE ROTOR BLADE

(71) Applicant: WOBBEN PROPERTIES GMBH, Aurich (DE)

(72) Inventor: Daniel Vinke, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/638,936

(22) PCT Filed: Aug. 20, 2018

(86) PCT No.: PCT/EP2018/072415
§ 371 (c)(1),
(2) Date: Feb. 13, 2020

(87) PCT Pub. No.: WO2019/038223
PCT Pub. Date: Feb. 28, 2019

(65) Prior Publication Data
US 2020/0224641 A1    Jul. 16, 2020

(30) Foreign Application Priority Data
Aug. 25, 2017   (DE) .................. 10 2017 119 484.3

(51) Int. Cl.
*F03D 80/30*     (2016.01)
*F03D 1/06*      (2006.01)
*H02G 13/00*     (2006.01)

(52) U.S. Cl.
CPC ........... *F03D 80/30* (2016.05); *F03D 1/0633* (2013.01); *H02G 13/80* (2013.01)

(58) Field of Classification Search
CPC ....... F03D 80/30; F03D 1/0675; H02G 13/00; H02G 13/80; H02G 3/22; H02G 13/40; B64D 45/02; H01Q 1/50
See application file for complete search history.

(56) References Cited

U.S. PATENT DOCUMENTS 3,850,501 A  *  11/1974  Butterfield ............... H02K 9/19
                                                          439/196
4,891,732 A  *   1/1990  Jones ..................... F16B 37/044
                                                          361/218
6,180,882 B1     1/2001  Dinh
                         (Continued)

FOREIGN PATENT DOCUMENTS

CA         2291197 A1      7/2020
CN       201679646 U      12/2010
                         (Continued)

*Primary Examiner* — Woody A Lee, Jr.
*Assistant Examiner* — Wesley Le Fisher
(74) *Attorney, Agent, or Firm* — Seed Intellectual Property Law Group LLP

(57) ABSTRACT

A wind turbine rotor blade comprising a lightning protection system. The lightning protection system has at least one receptor, a lightning protection conductor and a further element. A portion of the lightning protection conductor is in electrical contact with the further element by a connector. The connector has a screw with a collar as well as a nut with a female thread and a collar. The nut and the screw can be screwed together.

7 Claims, 5 Drawing Sheets

(56) References Cited

U.S. PATENT DOCUMENTS

| | | | |
|---|---|---|---|
| 6,991,478 B2 * | 1/2006 | Girinon | B64D 45/02 439/92 |
| 7,651,320 B2 | 1/2010 | Hansen | |
| 7,654,790 B2 * | 2/2010 | Molbech | H02G 13/80 415/1 |
| 8,461,452 B2 | 6/2013 | Munk-Hansen et al. | |
| 8,462,481 B2 * | 6/2013 | Lambert | B64D 45/02 361/218 |
| 9,169,826 B2 | 10/2015 | Muto | |
| 9,631,502 B2 | 4/2017 | Zeller et al. | |
| 9,741,474 B2 * | 8/2017 | Rehder | H02G 3/22 |
| 9,777,632 B2 | 10/2017 | Prather et al. | |
| 9,835,141 B2 * | 12/2017 | Erichsen | F03D 80/30 |
| 10,072,636 B2 * | 9/2018 | Hansen | F03D 80/30 |
| 2006/0280613 A1 | 12/2006 | Hansen | |
| 2010/0090472 A1 | 4/2010 | Berthelsen | |
| 2013/0028739 A1 * | 1/2013 | Erichsen | F03D 80/30 416/146 R |
| 2013/0177428 A1 | 7/2013 | Zeller et al. | |
| 2013/0195661 A1 | 8/2013 | Lind et al. | |
| 2014/0271190 A1 | 9/2014 | Hansen | |
| 2016/0348643 A1 | 12/2016 | Fujioka et al. | |
| 2017/0092393 A1 * | 3/2017 | Rehder | H02G 3/22 |
| 2019/0195203 A1 | 6/2019 | Fujioka | |

FOREIGN PATENT DOCUMENTS

| | | |
|---|---|---|
| CN | 102200099 A | 9/2011 |
| CN | 102661240 A | 9/2012 |
| CN | 104220747 A | 12/2014 |
| CN | 106194577 A | 12/2016 |
| CN | 106762469 A | 5/2017 |
| DE | 102006025036 A1 | 11/2007 |
| DE | 202010013535 U1 | 1/2011 |
| DE | 102010062819 A1 | 6/2012 |
| EP | 1022834 A1 | 7/2000 |
| EP | 2180197 A2 | 4/2010 |
| EP | 1664528 B1 | 12/2010 |
| EP | 2594809 B1 | 1/2017 |
| JP | 58-085002 U | 6/1983 |
| JP | 2011163132 A | 8/2011 |
| JP | 2012112481 A | 6/2012 |
| JP | 2013092072 A | 5/2013 |
| JP | 2015132245 A | 7/2015 |
| JP | 2016-519245 A | 6/2016 |
| WO | 2013/084634 A1 | 6/2013 |
| WO | 2016/007557 A2 | 1/2016 |

* cited by examiner

WIND TURBINE ROTOR BLADE AND LIGHTNING PROTECTION SYSTEM FOR A WIND TURBINE ROTOR BLADE

BACKGROUND

Technical Field

The present invention concerns a wind turbine rotor blade and a lightning protection system for a wind turbine rotor blade.

Description of the Related Art

Any wind turbine must have a lightning protection system in order to obtain a corresponding operating license. The lightning protection system typically has a plurality of lightning receptors which are electrically connected to a lightning protection conductor or lightning protection cable. The lightning protection conductor passes through the rotor blade to the rotor blade root and can then be contacted with the further lightning protection system of the wind turbine.

Reliable electrical contacting of the lightning protection system by way of various components is essential for operation of the wind turbine.

The lightning protection system of a wind turbine rotor blade typically has a plurality of pass-through contacting means, by means of which various components of the lightning protection system can be brought into contact with each other.

On the German patent application from which priority is claimed the German Patent and Trade Mark Office searched the following documents: DE 20 2010 013 535 U1, US 2010/0090472 A1 and US 2013/0195661 A1.

BRIEF SUMMARY

Provided is a wind turbine rotor blade which has improved pass-through contacting means or which has improved pass-through contacting options.

Provided is a wind turbine rotor blade comprising a lightning protection system. The lightning protection system has at least one receptor and a lightning protection cable and at least one connector for connecting two portions of a lightning protection conductor. The connector represents a pass-through contacting means and has a screw having a large collar. In addition the connector has a nut having a large collar and a female thread.

The screw and the nut each comprise a conductive material, for example metal like aluminum, copper or brass or alloys thereof in order to connect two portions of a lightning protection conductor together. By virtue of the fact that both the screw and also the nut each have a large collar both have a large contact area, the two portions of the lightning protection system that are to be connected, thereby permitting good electrical contacting.

Furthermore the female thread of the nut and the male thread of the screw permit the screw and the nut to be able to be fixedly connected together and thus the elements of the lightning protection system, that are to be connected, can also be fixedly connected together.

By virtue of the simple configuration of the nut and the screw this permits an effective and inexpensive possible way of connecting various elements of the lightning protection system. This construction is of a simple configuration and is advantageous to manufacture and can nonetheless dissipate high lightning currents without sparking. Furthermore wear is reduced.

According to an aspect of the present invention the screw has a hollow bore. By means of a screw and a self-locking nut it is possible for example to secure a cable terminal to the contacting screw. The screw with the self-locking nut produces a secure connection between the cable terminal and the screw of the pass-through contacting means and additionally ensures that the contact connector cannot come loose.

In addition the thread makes it possible to achieve the required contact pressure between the various components of the lightning protection system.

According to an aspect of the present invention the nut represents a self-locking nut.

Advantages and embodiments by way of example of the invention are described hereinafter with reference to the drawings.

DETAILED DESCRIPTION

Figure 1:
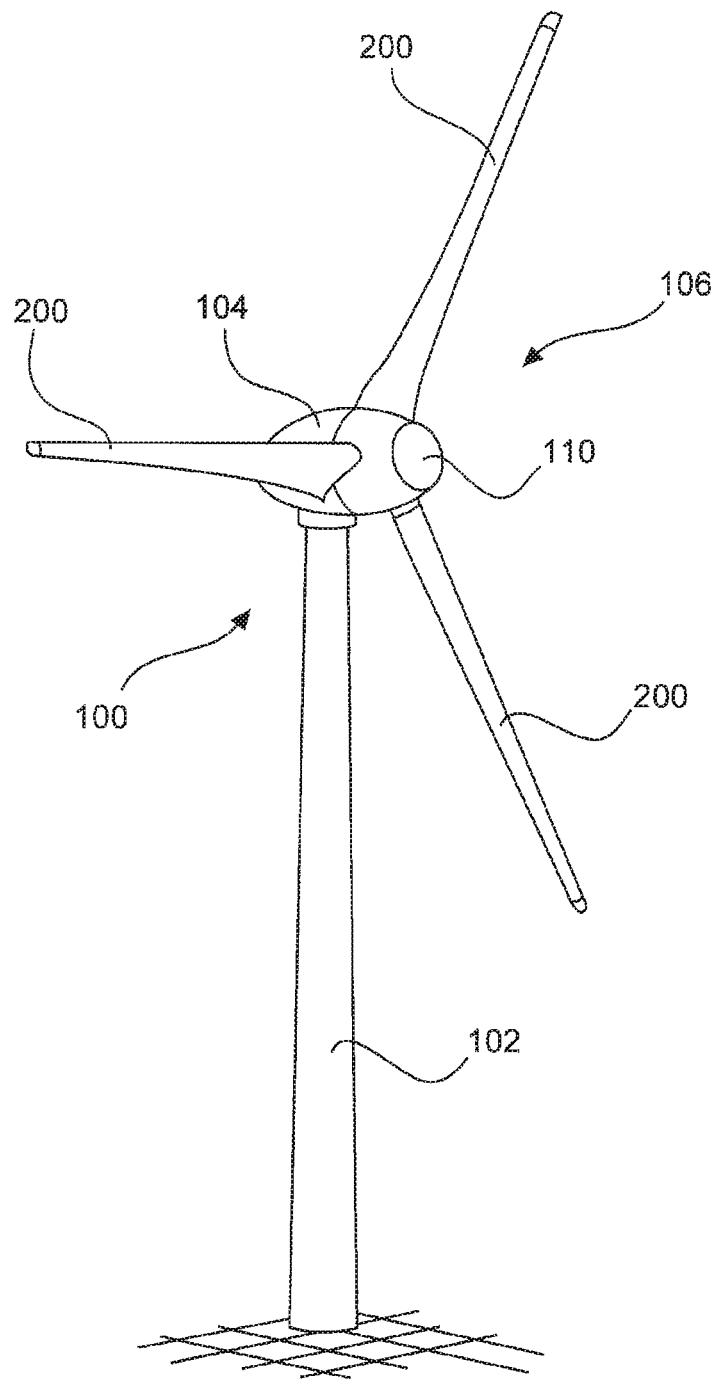
FIG. 1 shows a diagrammatic view of a wind turbine according to the invention.

FIG. 1 shows a diagrammatic view of a wind turbine according to the invention. FIG. 1 shows a wind turbine 100 comprising a tower 102 and a pod 104. A rotor 106 having three rotor blades 200 and a spinner 110 is arranged at the pod 104. In operation the rotor 106 is driven in rotation by the wind and thereby drives a generator in the pod 104.

Figure 2A:
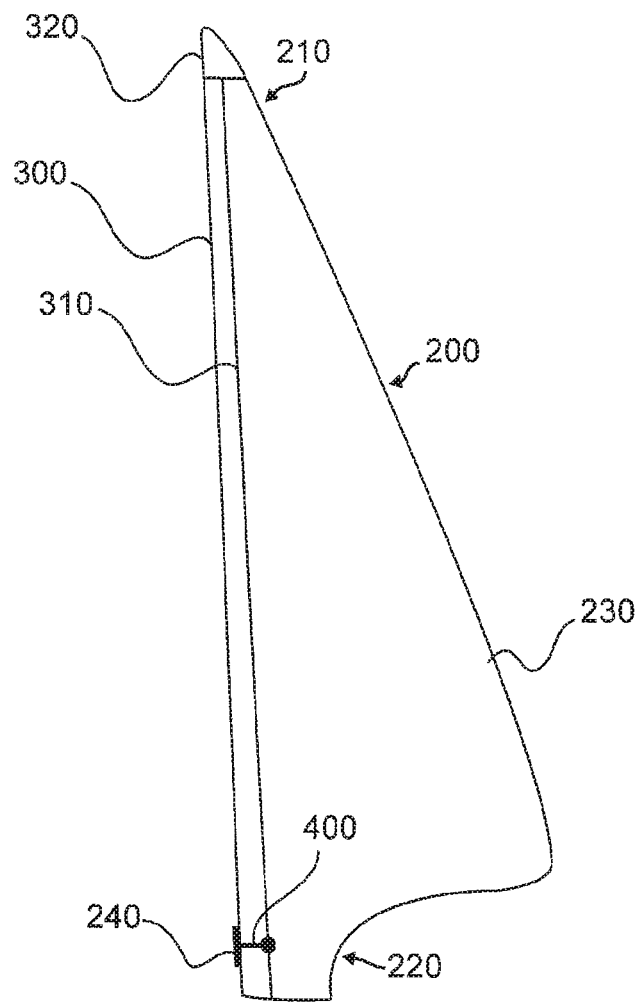
FIG. 2A shows a diagrammatic view of a wind turbine rotor blade.
Figure 2B:
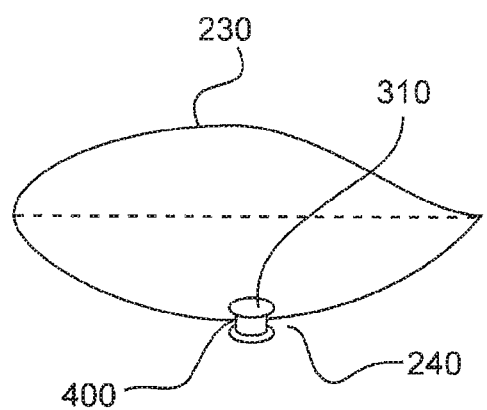
FIG. 2B shows a diagrammatic sectional view of the wind turbine rotor blade, and FIGS. 3A-3F each show various views of the connector.

FIG. 2A shows a diagrammatic view of a wind turbine rotor blade and FIG. 2B shows a diagrammatic sectional view of the wind turbine rotor blade. The rotor blade 200 has a rotor blade tip 210, a rotor blade root 220 and a rotor blade casing 230 which is composed for example of two interconnected half-shell portions. The rotor blade 200 has a lightning protection system 300 which has at least one receptor 320, a lightning protection conductor 310 and a dissipation ring 240 externally in the region of the rotor blade root. A connector 400 is provided between the lightning protection conductor 310 and the dissipation ring 240. The connector 400 thus connects a first portion of the lightning protection system, like for example the lightning protection conductor 310, electrically and mechanically to a second part of the lightning protection system, such as the dissipating ring 240.

Figure 3A:
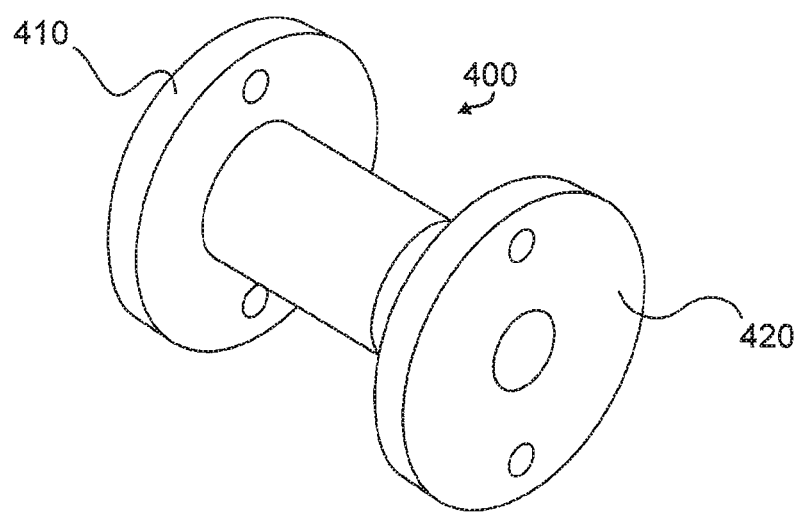
Figure 3B:
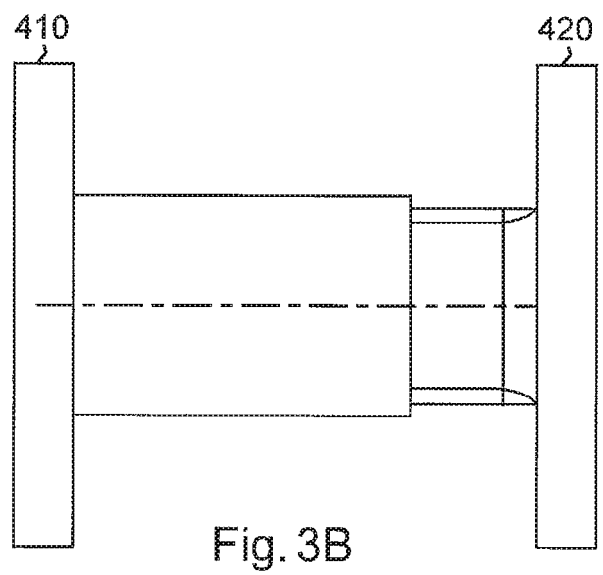
Figure 3C:
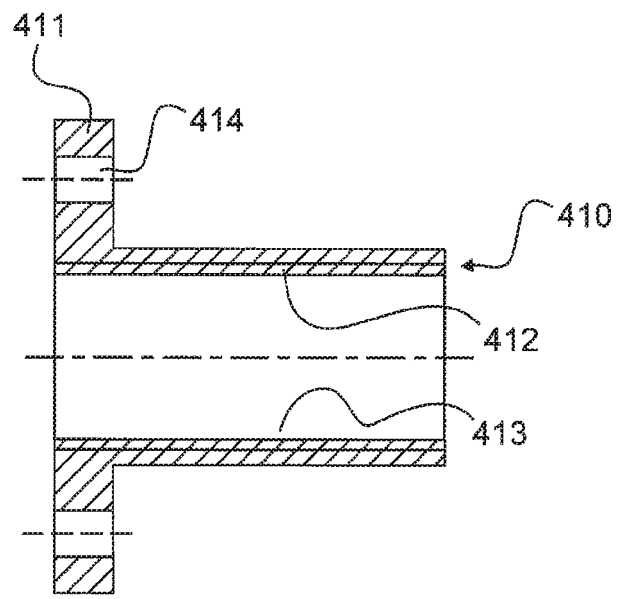
Figure 3D:
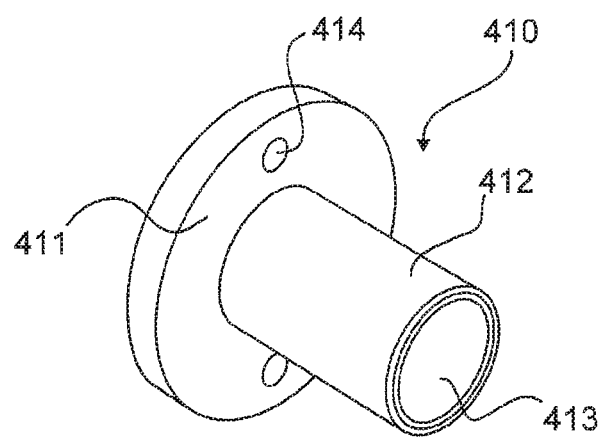
Figure 3E:
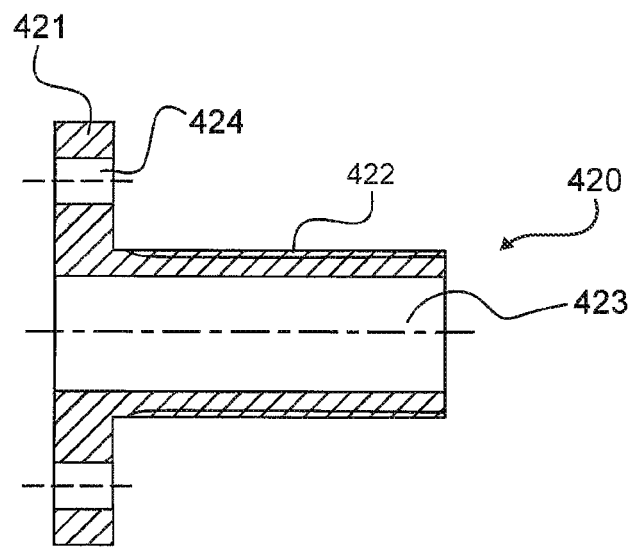
Figure 3F:
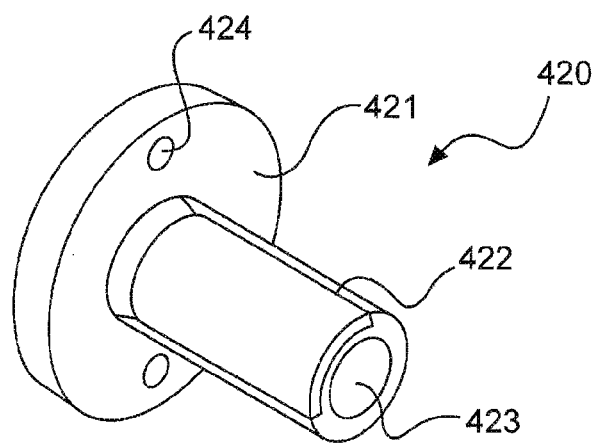

FIGS. 3A 3F each show various views of the connector. The connector 400 has a screw 420 and a nut 410 which can be screwed on to the screw 420. Various components of the lightning protection system can be electrically and mechanically connected together by means of the connector 400. By means of the connector it is also possible for various portions and elements of the lightning protection system to be electrically contacted with each other by way of non-conducting portions of the rotor blade.

As shown in FIGS. 3C and 3D, the nut 410 has a collar 411 with holes 414 and an elongate portion 412 having a bore and a female thread 413. As shown in FIGS. 3E and 3F, the screw 420 has a collar 421 having at least two holes 424 and an elongate portion 422 and optionally a bore 423 (a hollow bore). In addition a male thread is provided in the region of the elongate portion 422. The nut 410 can thus be screwed on to the screw 420 and in that way various elements of the lightning protection system can be securely connected together.

The outside diameter of the collars 411, 421 can be between 20-60 mm, preferably about 40 mm. The outside diameter of the portion 412 can be between 15 and 20 mm, preferably about 18 mm. The portion 422 can have a M14-M18 male thread, preferably a M16 thread. The portion 412 can have a corresponding female thread. The relationship between the outside diameter of the collars 411, 421 and the outside diameter of the portion 412 is preferably at least 2 and in particular greater than 3.

Thus there is provided a wind turbine rotor blade having improved lightning protection. A lightning current can be reliably and effectively conducted away between various portions of the lightning protection system without in that case resulting in sparking at the cable. That is made possible in particular by virtue of the large cross-sections and the contact areas of the collars of the nut and the screw. The connector 400 thus has a screw and a self-locking nut.

With the connector according it is possible to permit a connection to be made between various elements of the lightning protection system by a non-conducting material.

The invention claimed is:

1. A wind turbine rotor blade comprising:
   a rotor blade body; and
   a lightning protection system coupled to the rotor blade body and including a receptor, a lightning protection conductor, and a dissipation element, wherein a connector forms an electrical contact between a portion of the lightning protection conductor and the dissipation element,
   wherein the connector includes a screw and a nut, wherein the screw has a first end with a collar, a second end with an elongated portion, and a male thread at the elongated portion, wherein the nut has a first end with a collar and a second end having an elongated portion and a female thread in an opening of the elongated portion, wherein the screw is received in the opening of the nut such that the screw and the nut are screwed together by the male thread at the elongated portion of the screw and the female thread in the opening of the elongated portion of the nut,
   wherein the screw has a through bore,
   wherein the collar of the screw and the collar of the nut are disposed at mutually opposite sides of the connector when the screw with the male thread is screwed into the female thread of the nut, and
   wherein a ratio between an outside diameter of the collars of the screw and of the nut and an outside diameter of a portion of the nut is greater than 2.

2. The wind turbine rotor blade according to claim 1, wherein the ratio is greater than 3.

3. The wind turbine rotor blade according to claim 1, wherein the dissipation element is a dissipation ring.

4. The wind turbine rotor blade according to claim 3, wherein the dissipation element is located at a rotor blade root of the rotor blade body.

5. The wind turbine rotor blade according to claim 4, wherein the receptor is located at a rotor blade tip of the rotor blade body.

6. The wind turbine rotor blade according to claim 5, wherein the lightning protection conductor is coupled at a first end to the receptor and at a second end to the dissipation ring.

7. A wind turbine rotor blade lightning protection system, comprising:
   at least one receptor; and
   a lightning protection conductor and a dissipating element, wherein a connector forms an electrical contact between a portion of the lightning protection conductor and the dissipating element,
   wherein the connector has a screw and a nut, wherein the screw has a first end with a collar and a second end with an elongated portion and a male thread in a region of the elongated portion, wherein the nut has a first end with a collar and a second end having an elongated portion and a female thread, wherein the nut and the screw are configured to be screwed together by the male thread at the elongated portion of the screw and the female thread at the elongated portion of the nut such that the screw is received in the nut,
   wherein the screw has a through bore,
   wherein the collar of the screw and the collar of the nut are disposed at mutually opposite sides of the connector when the screw is screwed into the female thread of the nut, and
   wherein a ratio between an outside diameter of the collars of the screw and of the nut and an outside diameter of a portion of the nut is greater than 2.

\* \* \* \* \*